(12) United States Patent
Hunolt

(10) Patent No.: US 9,539,935 B2
(45) Date of Patent: Jan. 10, 2017

(54) SCREW CONNECTION IN A HEADLIGHT

(71) Applicant: Hella KGaA Hueck & Co., Lippstadt (DE)

(72) Inventor: Martin Hunolt, Lippstadt (DE)

(73) Assignee: HELLA KGAA HUECK & CO., Lippstadt (DE)

(*) Notice: Subject to any disclaimer, the term of this patent is extended or adjusted under 35 U.S.C. 154(b) by 47 days.

(21) Appl. No.: 14/416,594

(22) PCT Filed: Jun. 29, 2013

(86) PCT No.: PCT/EP2013/063759
§ 371 (c)(1),
(2) Date: Jan. 22, 2015

(87) PCT Pub. No.: WO2014/016080
PCT Pub. Date: Jan. 30, 2014

(65) Prior Publication Data
US 2015/0183367 A1 Jul. 2, 2015

(30) Foreign Application Priority Data

Jul. 24, 2012 (DE) .................. 10 2012 106 689

(51) Int. Cl.
*F16B 35/02* (2006.01)
*B60Q 1/04* (2006.01)
*B60Q 1/068* (2006.01)

(52) U.S. Cl.
CPC ........... *B60Q 1/0433* (2013.01); *B60Q 1/0683* (2013.01)

(58) Field of Classification Search
CPC ........... B60Q 1/02; B60Q 1/04; B60Q 1/0408; B60Q 1/0433; B60Q 1/0475; B60Q 1/0483; B60Q 1/0683; F16B 35/04; F16B 35/044; F16B 35/06; F16B 35/02
USPC .................................................. 411/383, 507
See application file for complete search history.

(56) References Cited

U.S. PATENT DOCUMENTS

| 4,967,318 A | | 10/1990 | Ewert et al. | |
|---|---|---|---|---|
| 5,214,971 A | * | 6/1993 | Burton ................. | B60Q 1/0683 362/528 |
| 5,331,519 A | * | 7/1994 | Fujino ................. | B60Q 1/0683 362/289 |
| 5,381,317 A | | 1/1995 | Schmitt et al. | |
| 5,508,896 A | * | 4/1996 | Suehiro ............... | B60Q 1/0683 362/289 |
| 5,541,815 A | * | 7/1996 | Nakamura .......... | B60Q 1/0683 362/273 |
| 5,546,287 A | * | 8/1996 | Yu C. .................. | B60Q 1/0683 362/273 |

(Continued)

FOREIGN PATENT DOCUMENTS

| DE | 2361959 A1 | 6/1975 |
|---|---|---|
| DE | 3048751 A1 | 7/1982 |
| FR | 2639588 A1 | 6/1990 |

*Primary Examiner* — Roberta Delisle
(74) *Attorney, Agent, or Firm* — Husch Blackwell LLP

(57) ABSTRACT

The invention relates to a screw connection (1) in ha headlight of a motor vehicle, which has a threaded element (10) with a screw shaft (11) that is screwed into a screw-in opening (12) of a headlight component (13). According to the invention, a protective sleeve (14) has been provided and mounted on at least a portion of the screw shaft (11) in such a way that the protective sleeve (14) covers the screw-in opening (12).

7 Claims, 1 Drawing Sheet

(56) References Cited

U.S. PATENT DOCUMENTS

| | | | | |
|---|---|---|---|---|
| 5,580,149 | A | * | 12/1996 | Kusagaya ............ B60Q 1/0683 362/273 |
| 5,673,992 | A | | 10/1997 | Schmitt et al. |
| 5,741,059 | A | * | 4/1998 | Kusagaya ............ B60Q 1/0683 362/273 |
| 6,394,637 | B1 | * | 5/2002 | Watanabe .............. B60Q 1/045 362/460 |
| 7,114,835 | B2 | * | 10/2006 | Brazas ................. B60Q 1/0683 362/424 |
| 7,207,704 | B2 | * | 4/2007 | Tachiiwa ............. B60Q 1/0683 362/512 |
| 7,303,321 | B2 | * | 12/2007 | Miller ................. B60Q 1/0683 362/428 |

* cited by examiner

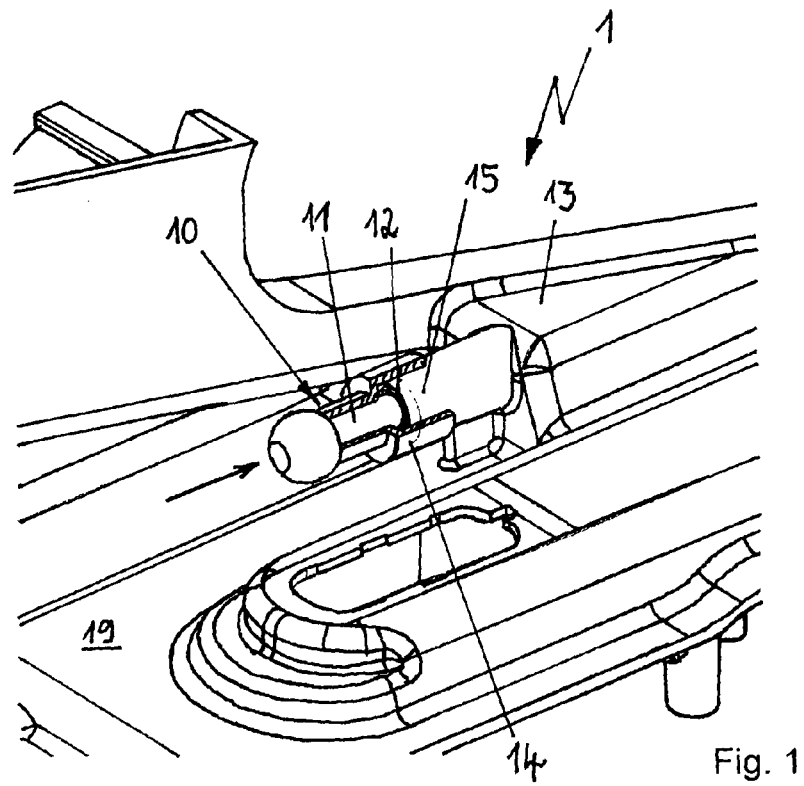
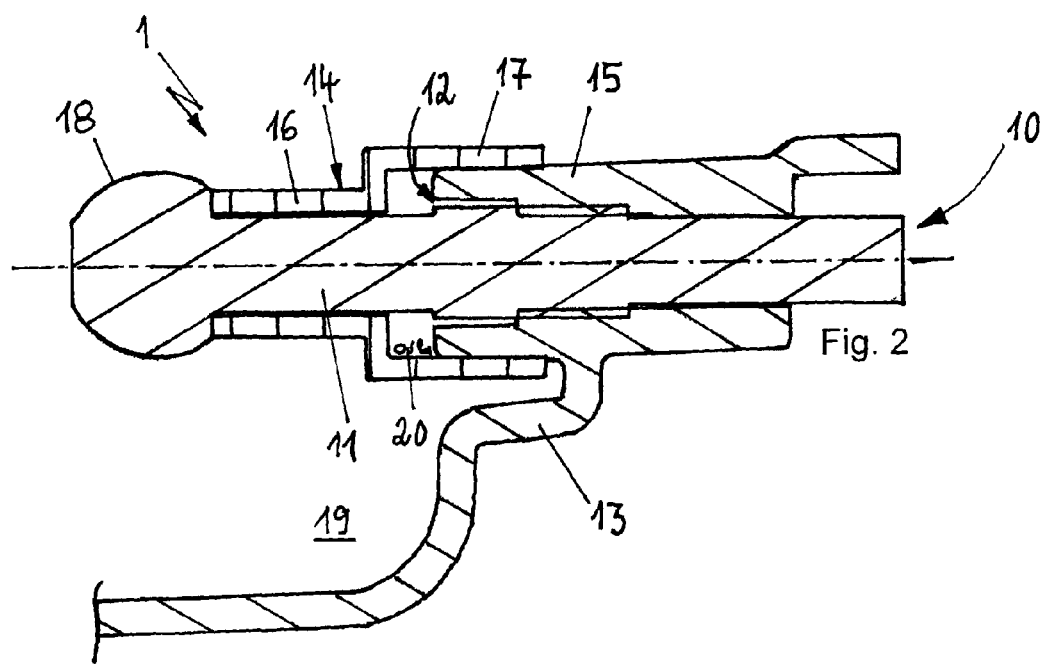

SCREW CONNECTION IN A HEADLIGHT

CROSS REFERENCE

This application claims priority to PCT Application No. PCT/EP2013/063759, filed Jun. 29, 2013, which itself claims priority to German Application No. 10 2012 106689.2, filed Jul. 24, 2012, both of which are hereby incorporated by reference.

FIELD OF TECHNOLOGY

The present invention proposes a screw connection in a headlight of a motor vehicle, which has a threaded element with a screw shaft that is screwed into a screw-in opening of a headlight component.

BACKGROUND

DE 38 41 632 C2 discloses a screw connection in a headlight of a motor vehicle, showing a threaded element with a screw shaft that is screwed into a screw-in opening. The headlight component is formed by a frame mounted on the motor vehicle. During the process of screwing the screw shaft into the screw-in opening, it is possible that screw shavings are generated from the material of the headlight component, especially when the threaded element has a self-tapping screw thread. The screw shavings thus generated can enter the headlight and interfere with the function of the headlight or after the headlight has been installed the screw shavings can be visible from outside of the headlight.

DE 10 2007 028 988 A1 discloses a further headlight with a screw connection, and the threaded element has a head, which forms a ball-shaped head for a flexible connection of a light module. When the threaded element is screwed into the frame, which forms the headlight component with the screw-in opening, and the screw thread of the screw shaft is designed as a self-tapping screw thread, it is disadvantageously possible that screw shavings can enter the headlight.

SUMMARY OF THE INVENTION

The present invention has the objective of further developing a screw connection in a headlight of a motor vehicle in such a way that screw shavings generated during the screw connection are prevented from penetrating the headlight.

The invention includes the technical knowledge that the screw connection is provided with a protective sleeve which encloses at least a portion of the screw shaft in such a way that the protective sleeve covers the screw-in opening.

To provide the screw connection with a protective sleeve has the special advantage that the protective sleeve is covering and sealing the screw-in opening so that screw shavings generated when screwing the screw shaft into the screw-in opening are prevented from entering in an uncontrolled manner the headlight. For example, the screw shaft can be designed with a self-tapping screw thread, and when the screw shaft is screwed into screw-in opening, screw shavings could be generated which could be pushed out of the screw-in opening in a direction opposite to the screw-in direction. Therefore, the protective sleeve is mounted over a portion of the screw shaft in such a way that the protective sleeve covers the side of the screw-in opening in the headlight component from which the screw shavings are pushed out. The screw shaft basically describes the shaft of the threaded element which is not necessarily provided with a screw thread over its entire length. For example, the protective sleeve can be mounted on a portion that is not provided with a screw thread.

The end of the screw-in opening can be designed in a projection in the headlight component, wherein the protective sleeve can enclose the outside of the projection. For example, the projection can form a screw dome, and the screw dome is provided with a hole, which forms the screw-in opening and into which the screw shaft of the threaded element is screwed. When prior to screwing in the threaded element the protective sleeve is located on the screw shaft, the protective sleeve can completely enclose the projection and thus prevent the generating screw shavings from entering the headlight.

According to an advantageous embodiment of the protective sleeve, the protective sleeve can have a shaft portion and a spout-formed sleeve portion, wherein the shaft portion is mounted on the screw shaft and the sleeve portion encloses the projection. The protective sleeve can be designed in such a way that it rotates symmetrically about a central axis which coincides with the central axis of the threaded element when the protective sleeve is mounted on the screw shaft. The internal diameter of the sleeve portion can correspond approximately to the external diameter of the projection, wherein it is of special advantage when the sleeve portion has a diameter that is slightly smaller than the projection, which would result in a sealing effect between the sleeve portion and the projection. When the screw element is screwed into the headlight component, the sleeve portion is slightly expanded when pushed over the projection and the shaft portion remains on the screw shaft.

Even in screwed-in condition, a portion of the screw shaft, on which the shaft portion of the protective sleeve has been mounted, can still protrude from the screw-in opening. For example, the threaded element can have a head and the protective sleeve is retained between the headlight component and the head of the threaded element. As a result, the protective sleeve is securely mounted on the threaded element and can permanently remain in the headlight of the motor vehicle as a component of the screw connection.

For example, the threaded element can form a ball-shaped head with a spherical head of the threaded element for receiving an element in the headlight, wherein the headlight component forms, for example, a housing of the headlight.

Alternatively, the headlight component can also form a support frame on which a light module is mounted by means of the threaded element.

The protective sleeve can consist of elastic material, in particular rubber material or soft plastic material. For example, the protective sleeve can consist of elastomer. In particular, the protective sleeve can have a length that is determined in such a way that it covers the screw-in opening already when the screw shaft is screwed into the screw-in opening. At the same time, the protective sleeve can be mounted in self-retaining manner on the threaded element or the headlight component. An advantageous embodiment can provide that the protective sleeve is pulled over the screw shaft or injection-molded on the screw shaft, so that no additional component has to be assembled when mounting the screw connection. However, alternatively, provision can also be made to attach the protective sleeve on the projection of the headlight component before the screw shaft is screwed through the shaft portion of the protective sleeve and into the screw-in opening in the process of screwing the threaded element into the screw-in opening.

Furthermore, the present invention involves also a protective sleeve for a screw connection in a headlight of a motor vehicle, wherein the screw connection has a threaded element with a screw shaft which can be screwed into a screw-in opening of a headlight component, wherein the protective sleeve is designed to be mounted on at least a portion of the screw shaft and to cover the screw-in opening. For this purpose, the protective sleeve can have a shaft portion for being mounted on the threaded element and a spout-formed sleeve portion for covering the screw-in opening. In particular, the protective sleeve can consist of elastic material, especially rubber material or soft plastic material.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 is a perspective view of a screw connection which has a protective sleeve according to the present invention, and FIG. 2 is a cross-sectional view through a screw connection which has a protective sleeve.

DETAILED DESCRIPTION OF THE DRAWINGS

FIG. 1 shows a screw connection 1 in a headlight of a motor vehicle which has a threaded element 10 with a screw shaft that is screwed into a screw-in opening 12 of a headlight component 13. The headlight component 13 is designed in an exemplary manner as a housing 13 of the headlight. A projection 15, which extends to the inside of the housing 19, is integrally molded to the housing 13. The screw-in opening 12 is located at the end of the projection 15. When the screw shaft 11 of the threaded element 10 is screwed into the screw-in opening 12, the threaded element 10 extends along the extension direction of the projection 15, and even when the threaded element 10 has been screwed in, a portion of the screw shaft 11 still protrudes from the headlight component 13.

The threaded element 10 has a head 18 which is designed as a ball-shaped head, and a further component of the headlight can be flexibly incorporated on the head of the threaded element 18. For example, it is possible to attach an additional high beam reflector, a support frame for a light module or a static cornering light on the head of the threaded element 18.

The screw-in direction for screwing the threaded element 10 into the screw-in opening 12 is represented with an arrow and shows that the screwing process is performed from the inside of the housing 19. The screw shaft 11 has a self-tapping screw thread, and the process of screwing the threaded element 10 into the screw-in opening 12 of the projection 15 can result in the fact that screw shavings are generated which can enter the housing 13 of the headlight. The screw shavings 20 are generated when the threaded element 10 is screwed into the screw-in opening 12, especially when the screw shaft 11 of the threaded element 10 has a self-tapping screw thread. At the same time, the screw shavings 20 consist of the material of the headlight component 13 which forms, for example, the housing 13 of the headlight. According to the invention, a protective sleeve has been mounted on the screw shaft 11 of the threaded element 10 to prevent an uncontrolled release of the screw shavings 20. The protective sleeve 14 covers the screw-in opening 12 in such a way that the screw shavings are prevented from entering in an uncontrolled manner the inside of the housing 19. The picture shows the protective sleeve 14 in the form of a diagram. FIG. 2 shows a cross-sectional view of the screw connection 1 in which the arrangement of the protective sleeve 14 is depicted in more detail.

FIG. 2 shows a cross-sectional view of the screw connection 1, which has the characteristics of the present invention. The screw connection 1 comprises a threaded element 10 that is screwed into a headlight component 13, and the headlight component 13 is designed in an exemplary manner as a housing 13 of a headlight. The threaded element 10 comprises a head 18 which has a spherical shape and forms a component of a ball joint, so as to attach on the threaded element 10 a component in the housing 13 of the headlight which forms, for example, an additional high beam reflector, a support frame for a light module or a static cornering light or the like. According to a further example, it is also possible to attach a headlight range adjuster on the head 18 of the threaded element. From the inside of the housing 19, the threaded element 10 is screwed into a screw-in opening 12, and the screw-in opening 12 forms the opening of a drill hole into which a screw shaft 11 of the threaded element 10 is screwed. The screw shaft 11 has a screw thread portion which cuts a counter thread during the process of screwing the threaded element into the drill hole. In the process, screw shavings 20 are generated which are pushed out of the screw-in opening 12.

According to the invention, provision has been made for a protective sleeve 14, which covers the screw-in opening 12, to prevent the screw shavings 20 from entering the inside 19 of the housing 13. The protective sleeve 14 has a shaft portion 16 and a sleeve portion 17, and the shaft portion 16 of the protective sleeve 14 is attached on a portion of the screw shaft which extends between the head of the threaded element 18 and the screw-in opening 12. At the same time, the sleeve portion 17 extends in the direction of the screw-in opening 12 and covers it. As a result, screw shavings 20 that are generated when screwing the screw shaft 11 into the screw-in opening 12 can be collected inside the protective sleeve 14, which prevents the screw shavings 20 from entering the housing 13 of the headlight.

The drill hole in the headlight component 13, which has at its end the screw-in opening 12, is designed in a projection 15, and the projection protrudes into the inside of the housing 19. At the same time, the protective sleeve 14 is arranged between the head of the threaded element 18 and the screw-in opening 12 that the sleeve portion 17 encloses and seals the outside of the projection 15. Furthermore, the shaft portion 16 of the protective sleeve 14 encloses the screw shaft 11 in such a way that the screw shavings 20 from the portion shown can no longer be pushed out of the internal sleeve portion 17 when the threaded element 10 is screwed into the screw-in opening 12. As a result, during the process of screwing the threaded element 10 into the headlight component 13, the screw shavings 20 are prevented from entering the housing of the headlight. Even after the screw connection 1 has been formed, the protective sleeve 14 remains in the position shown, and when the headlight is put in operation, the screw shavings 20 are permanently retained by the protective sleeve 14 and thus prevented from entering the inside of the housing 19.

The design of the present invention is not restricted to the preferred embodiment described above. Instead, it is possible to use a plurality of variants which can utilize the demonstrated solution even with basically different embodiments. All characteristics and/or advantages resulting from the claims, the description or the drawings, including structural details or spatial arrangements, can be important for the invention as individual components, as well as in different combinations. A potential attachment of the protective sleeve 14 prior to connecting the threaded element 10 with the headlight component 13 has not been shown. For example, before screwing the threaded element 10 into the screw-in opening 12, the protective sleeve 14 can be mounted on the screw shaft 11, so that the threaded element 10 forms together with the protective sleeve 14 an individually manageable structural compound. It is also possible to vulcanize or injection-mold the material of the protective sleeve 14 on the screw shaft 11. Alternatively, it is possible to attach the protective sleeve 14 with the sleeve portion 17 before connecting the threaded element 10 with the headlight component 17, for example, to mount the protective sleeve on the projection 15 and subsequently screw in the threaded element 10.

REFERENCE LIST

1 screw connection
10 threaded element
11 screw shaft
12 screw-in opening
13 headlight component, housing
14 protective sleeve
15 projection
16 shaft portion
17 sleeve portion
18 head of the threaded element, ball-shaped head
19 inside of the housing
20 screw shavings

The invention claimed is:

1. A screw connection in a headlight of a motor vehicle, comprising:
   a threaded element with a screw shaft that is screwed into a projection of a headlight component;
   a protective sleeve comprising a shaft portion and a spout-formed sleeve portion, wherein the shaft portion has a first internal diameter and the sleeve portion has a second internal diameter greater than the first internal diameter,
   wherein the first internal diameter of the shaft portion is slightly greater than an external diameter of the screw shaft, and wherein the second internal diameter of the sleeve portion is slightly smaller than an external diameter of the projection such that when the screw shaft is screwed into the projection.

2. The screw connection according to claim 1 wherein the threaded element has a head, wherein the protective sleeve is retained between the headlight component and the head of the threaded element.

3. The screw connection according to claim 1 wherein the threaded element forms a ball-shaped element with a spherical head for receiving an element in the headlight, wherein the headlight component involves a housing of the headlight.

4. The screw connection according to claim 1 wherein the protective sleeve consists of elastic material, in particular rubber material or soft plastic material.

5. The screw connection according to claim 1 wherein the protective sleeve has a length that is determined in such a way that it covers the screw-in opening already when the screw shaft is screwed into the screw-in opening.

6. The screw connection according to claim 1 wherein the protective sleeve can be mounted in self-retaining manner on the threaded element or the headlight component.

7. A screw connection in a headlight of a motor vehicle, comprising:
   a threaded element with a screw shaft that is screwed into a projection of a headlight component;
   a protective sleeve comprising a shaft portion and a spout-formed sleeve portion, wherein when the screw shaft is screwed into the projection, a cavity portion is formed between the sleeve portion and the screw shaft for collecting screw shavings generated by the screw shaft being screwed into the projection.

* * * * *